UNITED STATES PATENT OFFICE.

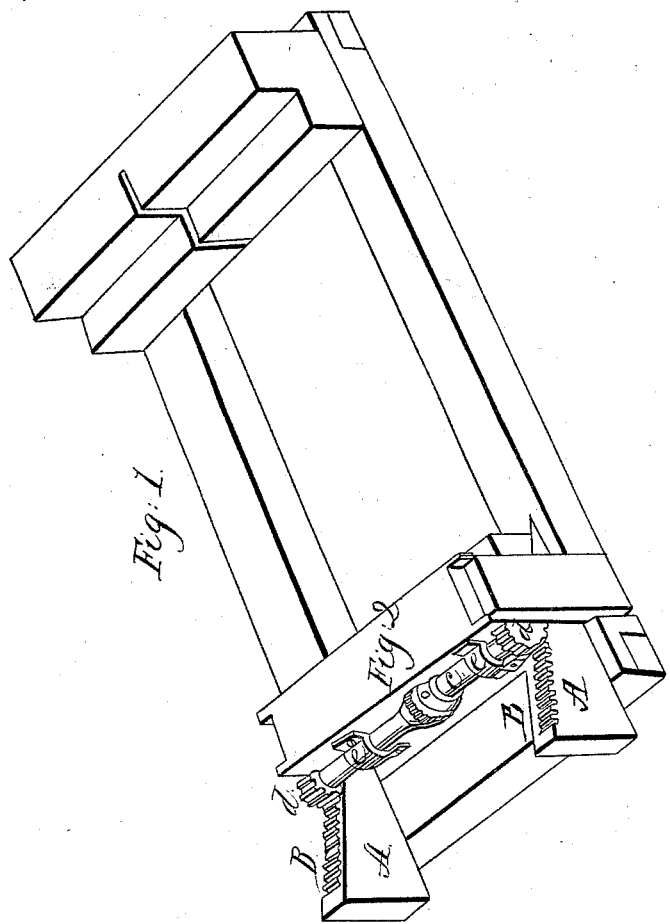

OLIVER B. JUDD, OF ROCKTON, NEW YORK.

SAWMILL.

Specification of Letters Patent No. 8,757, dated February 24, 1852.

*To all whom it may concern:*

Be it known that I, OLIVER B. JUDD, of Rockton, in the county of Herkimer and State of New York, have invented a new and useful Improvement in Sawmills; and I do hereby declare that the following is a full, clear, and exact description of the construction and operation of the same, reference being had to the annexed drawings, making a part of this specification, in which—

Figure 1 is a perspective view of the whole carriage head and tail-block with my improvement attached to the tail block. To construct the same, I make two wedge shaped pieces of wood (A, A,) about five feet long six inches thick about twenty inches wide at one end and running to a point. I bevel the tail block (Fig. 2) on the under side at each end fitted to the wedges (A A) in such a manner as will leave the tail block (Fig. 2) level. In the upper edge of these wedges (A, A,) I place a cast iron rack with cogs (B, B,) nearly the whole length of the wedges (A A) except that part lying under the tail block (Fig. 2). On the back edge of the said tail block I place a shaft of iron (C) with two pinions (D, D,) secured by boxes (E, E,) to the said tail block (Fig. 2) and the pinions are so placed on said shaft as to fit in the cogs (B. B). In the center of the shaft (C) are holes to receive the point of the mill bar by which the shaft (C) is rolled and carries the wedges (A A) by means of the rack and pinions under the tail block (Fig. 2) and raising it to any distance required according to the size of the log to be sawed.

The object of my improvement is to raise the end of the log that lies on the tail block sufficiently high so that when the saw commences cutting at the head block with the bottom of the saw and finish at the tail block with the top teeth of the saw, thereby enabling the operator to use the whole cutting edge of the saw every time it cuts through the log and keeping the edge of the saw straight by use, instead of jointing and filing the teeth that do not cut except in very large logs, also a saw of any length may be used and the saw kept straight by use which will cut twice the amount of lumber with the same time spent in filing.

I do not claim the common carriage as shown in the annexed drawings, but what I do claim and desire to secure by Letters Patent is—

Simply and substantially raising the tail block as above described or in any other way substantially the same.

OLIVER B. JUDD.

Witnesses:
SANFORD SNELL,
A. SNELL.